United States Patent [19]

Floyd

[11] Patent Number: 4,715,837
[45] Date of Patent: Dec. 29, 1987

[54] UNDERWATER VIEWING DEVICE

[76] Inventor: John F. Floyd, 858 Glenalyn Ave., Spartanburg, S.C. 29302

[21] Appl. No.: 891,418

[22] Filed: Aug. 1, 1986

Related U.S. Application Data

[63] Continuation of Ser. No. 690,869, Jan. 14, 1985, abandoned.

[51] Int. Cl.[4] .................................................. G02B 5/00
[52] U.S. Cl. ........................................ 441/135; 114/66
[58] Field of Search .................. 114/343, 357, 66; 441/135; 354/64; 350/319

[56] References Cited

U.S. PATENT DOCUMENTS

| | | | |
|---|---|---|---|
| 3,628,853 | 12/1971 | Stoscup | 114/66 |
| 4,145,783 | 3/1979 | Rhodes | 441/135 |
| 4,234,977 | 11/1980 | Snow | 441/135 |
| 4,465,468 | 8/1984 | Deacy | 441/135 |

Primary Examiner—Joseph F. Peters, Jr.
Assistant Examiner—Clifford T. Bartz
Attorney, Agent, or Firm—Dority & Manning

[57] ABSTRACT

An underwater viewing device that may be held in the water from a moving boat for viewing below the surface of the water. The device includes a transparent bottom with side walls secured thereto and extending upwardly therefrom, the side walls forming a water barrier totally around the bottom. One end of the bottom and corresponding side walls define a bow shape. An outwardly turned flange is located at the top of the side walls to permit one to conveniently hold the device in the water while the boat is moving, or to which a boat mounted support may be secured.

4 Claims, 6 Drawing Figures

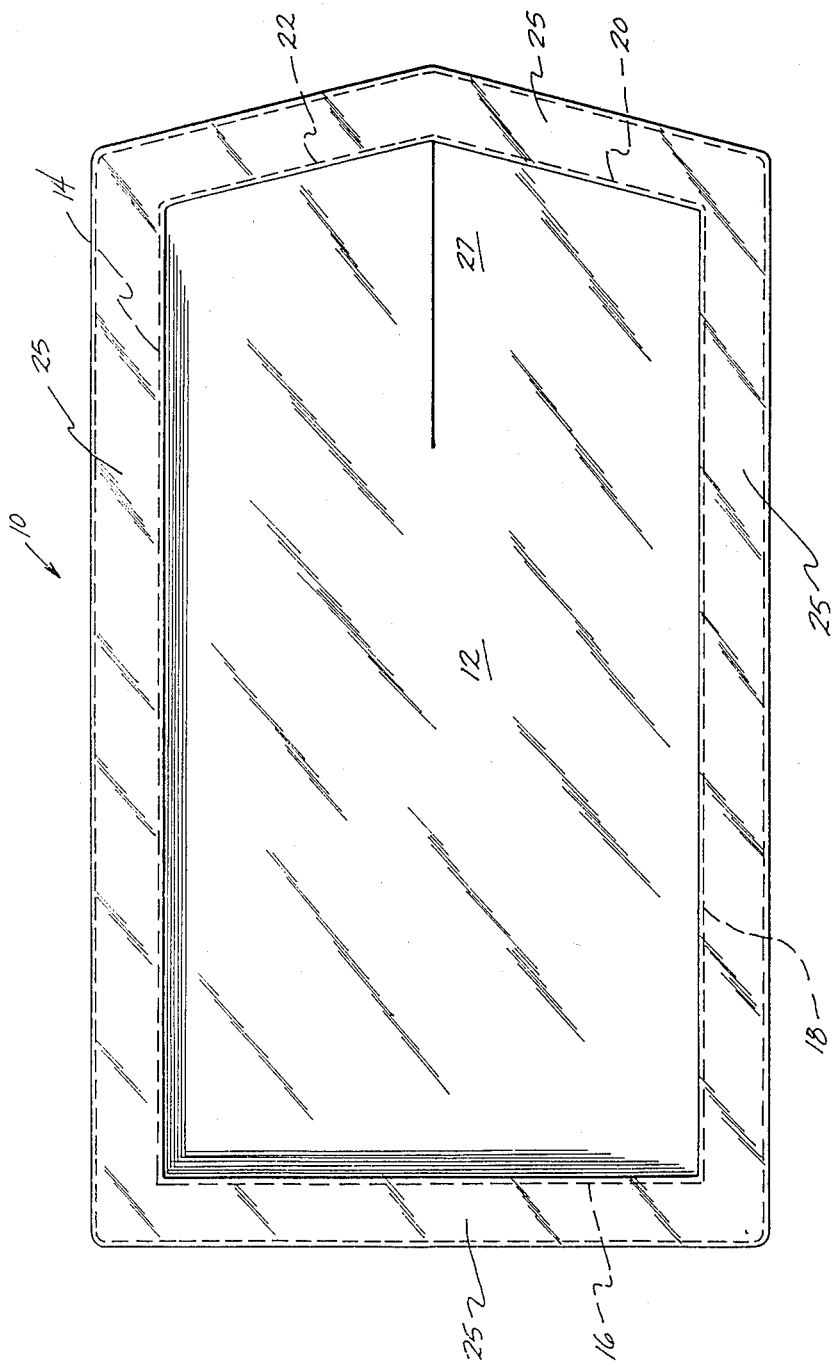

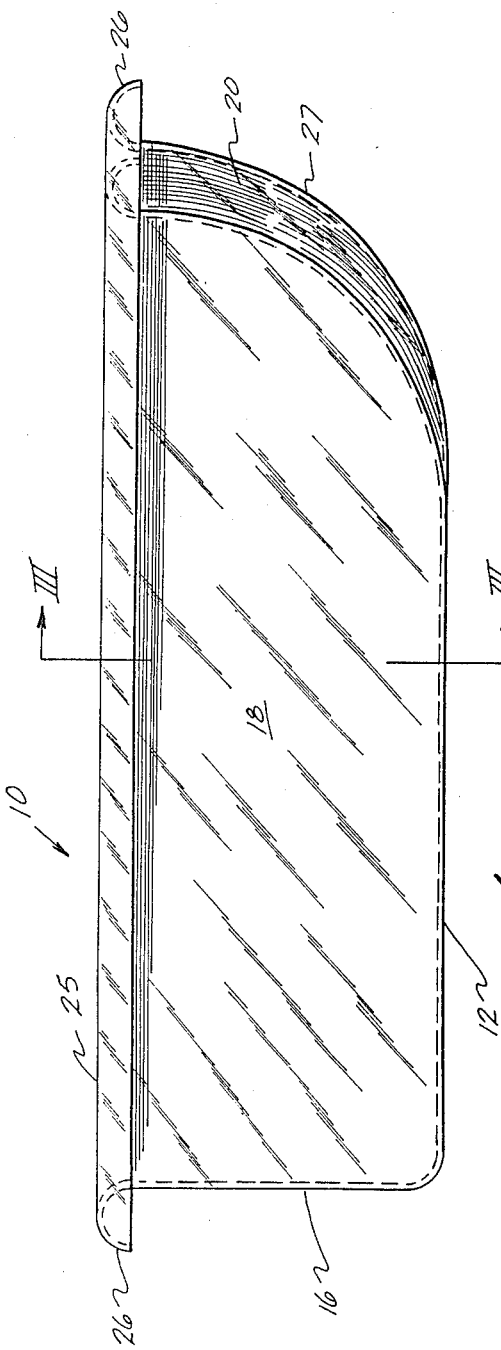
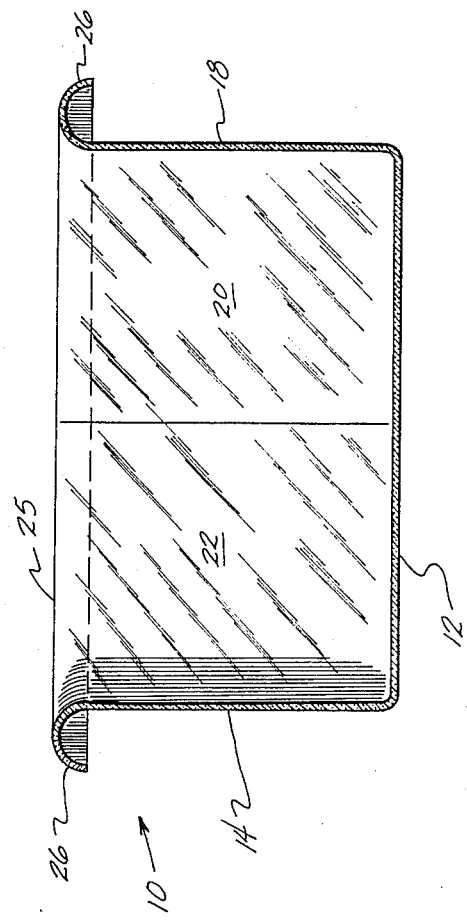

UNDERWATER VIEWING DEVICE

This is a continuation, of application Ser. No. 690,869, filed 1-14-85, which was abandoned upon the filing hereof.

BACKGROUND OF THE INVENTION

The present invention relates to a device that may be hand-held or otherwise supported from a moving boat in the upper surface of a body of water, while permitting one to visually observe beneath the surface of the water, and particularly the underlying bottom in shallow water in search of shells, marine life, and the like.

Devices have heretofore been available for use in basically clear water to permit viewing of the underlying bottom from above with greater clarity than when only the naked eye is being utilized. In particular, such structures have been fabricated within the hull of a boat and as an integral part of the boat to permit persons riding in the boat to look therethrough and visually observe marine life, shells and the like beneath the surface of the water. These boat installed viewing devices have in general included a transparent panel that is secured to and forms a part of the bottom of the boat. Boxing is added about the transparent panel and extends upwardly therefrom to a point where one riding in the boat may conveniently look downwardly through the transparent panel to view the undersea life. Often, a second transparent panel is located atop the boxing to preclude the accumulation of dust, dirt, trash and the like atop the bottom transparent panel, and to avoid breakage of same.

Additionally, underwater viewing devices of various sizes and shapes have heretofore been constructed to permit one wading in the water to look through the device and visually observe activity below the surface of the water. This type device is generally equipped with some means for floatation of same. In use, therefore, one may simply push the device about in the water and look through a transparent panel for viewing beneath the surface. Structurally speaking, this type device normally employs a transparent lower panel with a floatation means located therearound, and may include other appurtenances for storage of shells, etc., openings for water drainage and the like. One such underwater viewing device that is currently being used around the Carribean Islands where the clarity of the water permits superb observation, is a simple wooden bucket having a transparent bottom.

All of the known prior art devices, including those specifically discussed above may be successfully employed in particular situations to enhance underwater viewing. There is, however, no known device that is satisfactory for utilization in conjunction with a moving boat where the device is not an integral part of the boat. Further, in this regard, obviously devices built integral with a boat are expensive, limit utilization of the total interior of the boat, can lead to leakage problems and could even sink the boat if broken. In general, such boat mounted devices are only present in boats that are being utilized specifically for underwater viewing, as opposed to conventional boating uses.

Particularly, the hand-held devices of the prior art referred to above, such as the wooden bucket with a transparent bottom, are not at all suitable for use in conjunction with a moving boat where the device is hand-held or otherwise suspended in the water over the side of the boat. Specifically, it is desirable when an underwater device is held over the side of a moving boat, that an individual holding the device be able to do so with minimal strength requirements. With the bucket design, holding same from a moving boat is quite difficult. The generally round shape of the bucket offers significant resistance to the water, to a point where it is difficult to keep the transparent bottom in the water for proper viewing. Also the bucket affords no convenient means for one to hold same. All-in-all, the bucket approach is unsatisfactory for use in conjunction with a moving boat. Due to the lack of availability of suitable underwater viewing device, however, the bucket is being utilized.

The underwater viewing device according to the present invention overcomes the problems of the aforementioned prior art devices. The present device is small and portable, and after use can be conveniently stored. As such, the structure of the boat, per se, is unaffected unless mounting brackets are utilized to suspend the device in the water. Expense of integral installation is thus avoided as well as the inconvenience attendant to a permanent installation. Furthermore, the device according to the present invention is not only provided with suitable means for the hand-holding of same over the side of a moving boat, but also the shape and general contour enable the device to move through the water with significantly less resistance than is experienced with known prior art devices.

Exemplary of the known patented prior art relative to the present invention in addition to that described above, are U. S. Pat. Nos. 2,404,556; 4,042,945; 3,081,726; 3,324,819; 3,506,332; 3,628,853; 3,808,621; 4,145,783 and 4,228,751.

None of the known prior art is believed to anticipate or suggest the underwater viewing device of the present invention.

SUMMARY OF THE INVENTION

It is an object of the present invention to provide an improved underwater viewing device.

Another object of the present invention is to provide an improved underwater viewing device that may be hand-held or otherwise supported in the water from a moving boat.

Still further another object of the present invention is to provide an underwater viewing device which when held in the water from a moving boat improves the ability of one to locate underwater marine life, shells and the like.

Yet another object of the present invention is to provide an improved underwater viewing device that is economical, portable, and which may be held in the water to permit viewing from a moving boat while the geometry of the device aids in reducing resistance to the water passing thereby.

Generally speaking, the underwater viewing device according to the present invention comprises a body, said body having a transparent bottom, and walls secured to said bottom around the periphery of same and extending upwardly therefrom for a predetermined distance, said walls defining a continuous surface about and upwardly from said transparent bottom, at least certain of said walls having means thereon to facilitate holding of the device from a boat and certain of said walls converging to form a bow shape so that water is directed around said device as said device is held in the water from a moving boat.

More specifically, the underwater viewing device of the present invention is preferably of unitary construction, having been molded from a polymeric material which in molded form is transparent, and which, in a most preferred embodiment includes an outwardly turned flange or lip at an upper end of the side walls of the device to facilitate holding of the device in the water, particularly from a moving boat. In order to lessen the resistance of water encountering the device during movement of the boat, at least one end of the device is bow-shaped. Water is thus diverted around the device. Moreover, the height of the side walls coupled with the out-turned flange around the periphery of the device minimizes water splash into the interior of the device thus reducing the likelihood of water covering the transparent bottom and reducing visibility therethrough. Also, whereas, as mentioned above, the molded device may be totally transparent, all or a portion of the side walls may be colored or otherwise masked to obstruct the passage of sunlight or glare through the side walls.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a top plan view of an underwater viewing device according to teachings of the present invention.

FIG. 2 is a side elevational view of the underwater viewing device as illustrated in FIG. 1.

FIG. 3 is a vertical cross-sectional view of the underwater viewing device as illustrated in FIGS. 1 and 2, taken along a line III—III of FIG. 2.

DESCRIPTION OF THE PREFERRED EMBODIMENT

Figure 4:
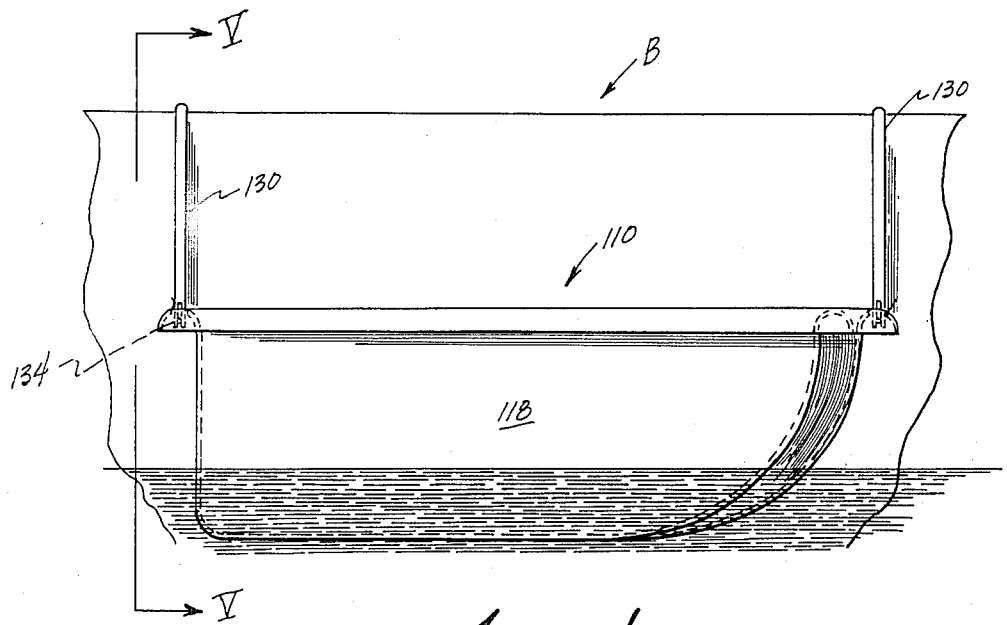
FIG. 4 is a partial side elevational view of a boat in the water having an underwater viewing device according to the present invention supported therefrom.

Making reference to the Figures, preferred embodiments of the present invention will now be described in detail.

FIGS. 1-3 illustrate a most preferred embodiment of the present invention wherein a body generally indicated as 10 is provided that is of molded, unitary construction, having been manufactured from a polymeric material, such as polypropylene or the like which in the molded form is transparent. As such, the entire device may be transparent for improved visibility beneath the surface of the body of water in which the device is being deployed. Alternatively, as discussed hereinafter, all or a portion of the side walls may be colored or otherwise masked to reduce or prevent passage of sunlight or glare therethrough.

The device of the present invention includes a transparent bottom 12 having side walls 14, 16, 18, 20 and 22 secured thereto and extending upwardly therefrom for a distance adequate to minimize water splash over the side of same onto an upper surface of bottom 12. Walls 14, 16, 18, 20 and 22 are illustrated as being secured totally around the periphery of bottom 12, and as such when the various walls are united at their adjacent edges if independent wall elements are employed, or as shown in the Figures when a unitary construction is provided, the overall wall structure generally precludes ingress of water into the interior of same whereby visibility through transparent bottom 12 is enhanced. An out-turned flange 25 is located at the top of the various side walls around the periphery of the entire device with flange 25 having a downturned outer free portion 26. With such an arrangement, the device of the present invention may be conveniently held by one located in a boat and suspended in an upper surface of the body of water being traversed.

As further illustrated particularly in FIGS. 1 and 2, at least one end of device 10 may be generally bow-shaped. Particularly, side walls 20, 22 extend upwardly from bottom 12 and converge to form a bow shape 27. When device 10 is held in the water from a moving boat, the bow shape 27 when positioned forwardly, will divert water flow around the device and thus reduce resistance of the device in the water and minimize water splash into the interior of the device, both of which aid in enhanced use of the device.

Figure 6:
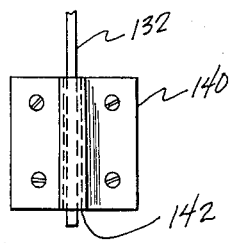
FIG. 6 is a frontal view of a suitable mounting bracket for the viewing device support system as illustrated in FIGS. 4 and 5.

While outturned flange 25 and downturned outer free portions 26 define a convenient means for one gripping and holding viewing device 10 in the water from a moving boat, as mentioned hereinbefore, device 10 could likewise be suspended from a suitable support affixed to the boat. Such an arrangement is illustrated in part in FIGS. 4 through 6. A viewing device 110 is shown constructed as illustrated in FIGS. 1 through 3 except as discussed hereinafter. A pair of support means 130 are secured to a boat, generally B, and extend over the side of same, downwardly towards the water.

As illustrated, a bracket 140 is secured to an inside of side wall SW of boat B and defines a vertical sleeve 142 within which an end 132 of support means 130 is received. Opposite, outer free end 134 of support means 130 is provided with a locking lug 136 or the like for securement of viewing device 110 thereto. As illustrated particularly in FIGS. 4 and 5, free end 134 of support means 130 is bifurcated and receives lug 136 therewithin with lug 36 being pivotally secured thereto.

Outturned flange 125 of underwater viewing device 110 defines openings 127 therein through which lugs 136 may pass when pivoted into a generally coplanar relationship with support means 130. After passage through opening 127, lug 136 is turned to a position perpendicular to support means 130 (see FIG. 5), and locks viewing device 110 thereto. Viewing device 110 is thus supported in water W for underwater viewing through transparent bottom 112. With support means 130 residing freely within opening 127 of flange 125, wave action in water W will cause device 110 to move up and down support means 130 as boat 13 moves through the water thus reducing resistance and oversplash into viewing device 110.

Figure 5:
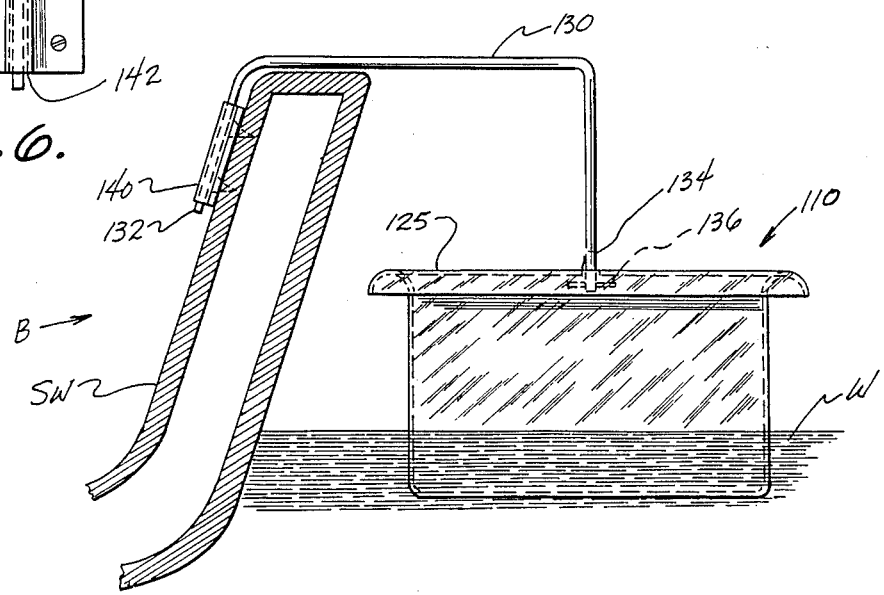
FIG. 5 is a partial vertical cross-sectional view of the boat of FIG. 4 illustrating a rear view of the supported viewing device.

Also referring to FIG. 4, in certain instances it is desirable to reduce or shield against passage of sunlight or glare through that portion of the side walls located above the waterline. Such side walls, as exemplified by wall 118 of FIG. 4 may be colored by painting as during the molding process, or masked by the securement of a shading element thereover. Preferably, that portion of the side walls located below the waterline should remain transparent.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. An underwater viewing device comprising:
    a body, said body comprising a flat transparent bottom having a generally elongated rectangular shape with a pointed end, walls of unitary construction with said bottom and extending upwardly therefrom for a distance adequate to preclude substantial water splash thereover during normal use, said walls having means for reducing passage of light therethrough, said walls at said pointed end of said bottom defining a bow shape thereat, and an outwardly turned flange of unitary construction with said walls, said flange extending around at least a major portion of the periphery of said body near the top of said walls and permitting said device to be held by one in a moving boat and suspended in the water whereby one may view beneath the surface of the water through the transparent bottom; said bow shape defining a center line extending from an inward portion of said outwardly turned flange to said pointed end of said bottom, said center line being the most forwardly extending portion of said bow shape, said walls defining said bow shape defining a pair of surfaces to each side of said center line and extending continuously from said inner portion of said outwardly turned flange to said bottom;
    said flange defining support receiving openings therein, so that said device may be secured to a boat mounted support device;
    a generally C-shaped rigid support device having one end secured to one of said receiving openings in said flange; and
    a bracket mounted on a side of a boat and securing said other end of said support device thereto.

2. An underwater viewing device comprising a body, said body comprising a flat transparent bottom having a periphery defining a polygon, walls of uninterrupted unitary contruction with said bottom and extending upwardly therefrom for a distance adequate to preclude substantial water splash thereover during normal use, said walls having means for reducing passage of light therethrough, an outwardly turned flange of unitary construction with said walls, said flange having an upwardly turned portion connected to said walls and a downwardly turned portion defining a free end of said flange, said downwardly turned portion of said flange terminating sufficiently above said bottom so as to remain above the normal waterline of the device when the device is in use, said downwardly turned portion of said flange providing a portion of said device to be held by one in a moving boat while the device is suspended in the water whereby one may view beneath the surface of the water through the transparent bottom, at least one of said walls defining a bow shape extending continuously from said upwardly turned portion of said flange to said bottom to define a continuous flow path which reduces the drag associated with the viewing device so that one can hold the device by said flange as the device moves through the water.

3. An underwater viewing device as defined in claim 2 wherein said flange extends totally around the periphery of said body.

4. An underwater viewing device as defined in claim 2 wherein said flange defines support receiving openings therein, so that said device may be secured to a boat mounted support device.

* * * * *